United States Patent [19]
Miyauchi et al.

[11] Patent Number: 5,206,675
[45] Date of Patent: Apr. 27, 1993

[54] REAL IMAGE MODE FINDER OPTICAL SYSTEM

[75] Inventors: Yuji Miyauchi, Okaya; Tatsuru Kanamori, Hachiouji, both of Japan

[73] Assignee: Olympus Optical Co., Ltd., Tokyo, Japan

[21] Appl. No.: 698,843

[22] Filed: May 13, 1991

[30] Foreign Application Priority Data

May 15, 1990 [JP] Japan .................. 2-124860

[51] Int. Cl.$^5$ .............................................. G03B 13/02
[52] U.S. Cl. .................... 354/219; 359/833
[58] Field of Search .............. 354/219, 222, 224, 225; 359/837, 643–647, 726, 833, 834, 835

[56] References Cited

U.S. PATENT DOCUMENTS 4,751,539  6/1988  Yamada et al. .................. 354/222
4,842,395  6/1989  Sato et al. ........................ 359/380

FOREIGN PATENT DOCUMENTS 57-146129   9/1982  Japan .
61-156018   7/1986  Japan .
63-44616    2/1988  Japan .
63-226616   9/1988  Japan .
1-255825   10/1989  Japan .

Primary Examiner—Michael L. Gellner
Assistant Examiner—Howard B. Blankenship
Attorney, Agent, or Firm—Cushman, Darby & Cushman

[57] ABSTRACT

A real image mode finder optical system includes an objective lens, an image inverting optical member erecting an image of an object formed by the objective lens, and an eyepiece for observing the object image, in which the last reflecting surface of the image inverting optical member is constructed, as a prism, integral with the eyepiece. Whereby, the real image mode finder optical system has practically important advantages that the overall length can be reduced, with performance maintained, without any increase of the number of parts and the image inverting optical member can also be arranged at the rear end of the camera body.

4 Claims, 8 Drawing Sheets

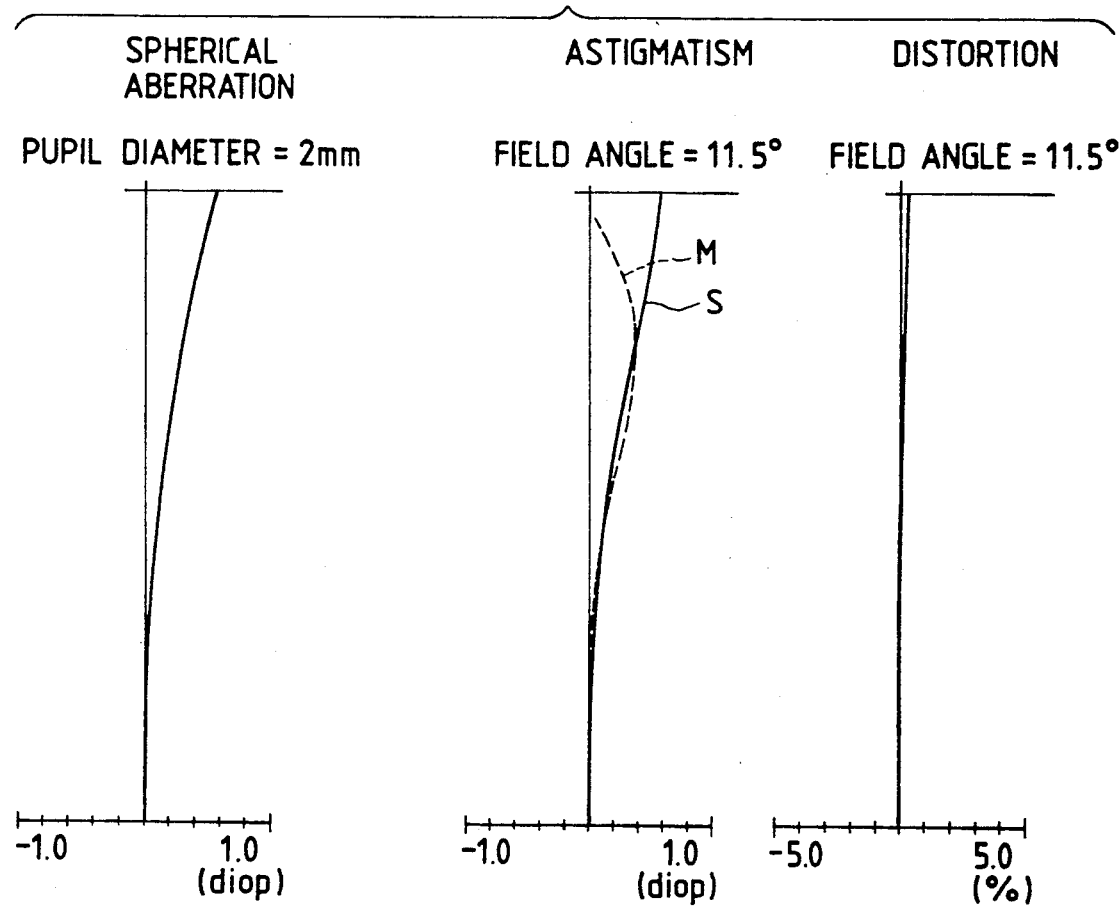

REAL IMAGE MODE FINDER OPTICAL SYSTEM

BACKGROUND OF THE INVENTION a) Field of the Invention

This invention relates to a real image mode finder optical system suitable for compact cameras such as cameras for photography with silver halide and video cameras.

b) Description of the Prior Art

In general, the finder optical system includes a virtual image mode such as an Albada type or an inverse Galilean type and a real image mode such as a Keplerian type. Most of the finder optical systems for compact cameras have adopted the virtual image mode in the past. This appears to result from the fact that the use of the finder optical system of the type, which dispenses with the need of a means for erecting an image, makes it possible to reduce the number of parts and diminish the length in a direction along an optical axis.

Recently, on the other hand, from the reasons that an indicating member like a field frame is easy of view, the effective diameter of a lens can be made small, and an image inverting optical member such as a Porro prism has come to be manufactured into integral forming of plastic, the use of real image mode finder optical systems has been increasing which, for instance, are set forth in Japanese Patent Preliminary Publication Nos. Sho 61-156018 and Sho 63-44616.

A typical example of such prior art is fundamentally constructed as shown in FIG. 1 (sectional view), in which reference numeral 1 represents an objective lens, 2 an image inverting optical member which is a Porro prism, and 3 an eyepiece.

FIGS. 2 and 3 are a developed view and aberration curve diagrams, respectively, of the optical system excluding the objective lens 1 from the conventional example, and its numerical data are shown below.

| | | | |
|---|---|---|---|
| $r_1 = 25.0334$ | | | |
| | $d_1 = 36.0000$ | $n_1 = 1.49216$ | $\nu_1 = 57.50$ |
| $r_2 = -16.7986$ | | | |
| | $d_2 = 0.2000$ | | |
| $r_3 = 7.2998$ (aspherical surface) | | | |
| | $d_3 = 2.0000$ | $n_2 = 1.49216$ | $\nu_2 = 57.50$ |
| $r_4 = 8.1714$ | | | |
| | $d_4 = 15.0000$ | | |
| $r_5 = $ (pupil) | | | |

Aspherical coefficients
Third surface
$E = -0.11367 \times 10^{-3}$, $F = -0.49046 \times 10^{-7}$
$G = -0.83477 \times 10^{-7}$ In the above conventional example, however, an image of an object formed through the objective lens 1 is assumed to be located adjacent to a first surface. Reference symbols $r_1, r_2, \ldots$ represent radii of curvature of individual lens surfaces, $d_1, d_2, \ldots$ thicknesses of individual lenses and spaces therebetween, $n_1, n_2, \ldots$ refractive indices of individual lenses, $\nu_1, \nu_2, \ldots$ Abbe's numbers of individual lenses, and E, F and G aspherical coefficients of fourth, sixth and eighth orders, respectively. The configuration of the aspherical surface in the conventional example is expressed by the following equation using the aspherical coefficients:

$$X = \frac{CS^2}{1 + \sqrt{1 - PC^2S^2}} \pm ES^4 + FS^6 + GS^8$$

where X is the distance from the vertex of the aspherical surface in a direction parallel to the optical axis, S is the distance from the vertex of the aspherical surface in a direction perpendicular to the optical axis, and C is the curvature ($=1/r$) at the vertex of the aspherical surface.

In the preceding real image mode finder optical system of the conventional example, however, the position of the object image formed by the objective lens 1 is located in front of the image inverting optical member 2, behind which the eyepiece 3 is arranged, so that the length of the optical system in the direction along the optical axis is limited in reduction.

Thus, in order to solve such a problem, optical systems are proposed in which the imaging position provided by the objective lens 1 is located inside the image inverting optical member 2 with the intention of reducing the overall length, as is set forth in Japanese Patent Preliminary publication Nos. Sho 63-226616 and Hei 1-255825. Such prior art, however, has defects that since the field frame or the like is disposed at the imaging position, a component which can be originally configured or worked as a unit, for example, the Porro prism, must be divided into two elements, with the resultant increase of the number of parts, and the arrangement of the eyepiece 3 disposed behind the image inverting optical member 2 may cause the eyepiece 3 to protrude from the camera body, according to the position of the image inverting optical member.

SUMMARY OF THE INVENTION

It is, therefore, the object of the present invention to provide the real image mode finder optical system in which the overall length of the finder optical system can be reduced, with performance maintained, without any increase of the number of parts and the image inverting optical member can also be arranged at the rear end of the camera body.

This object is accomplished, according to the present invention, by the arrangement that, in the real image mode finder optical system comprising an objective lens, an image inverting optical member erecting an image of an object formed by the objective lens, and an eyepiece for observing the object image, the final reflecting surface of the image inverting optical member is constructed integral with the eyepiece as a prism.

According to the present invention, the real image mode finder optical system is constructed so that both the entrance and exit surfaces of the eyepiece shaped into prism-like forms have curvatures. Whereby, the degree of freedom is increased with respect to the setting of the optical path length of the finder optical system to facilitate the layout in the camera body, and the finder optical system can be favorably corrected for aberrations.

Further, according to the present invention, the real image mode finder optical system is such that at least one of the entrance and exit surfaces of the eyepiece shaped into prism-like forms is an aspherical surface. Whereby, the finder optical system can be further favorably corrected for aberrations.

This and other objects as well as the features and the advantages of the present invention will become apparent from the following detailed description of the preferred embodiments when taken in conjunction with the accompanying drawings.

BRIEF DESCRIPTION OF THE DRAWINGS

FIGS. 15 and 16 are a developed view and aberration curve diagrams, respectively, of the optical system excluding the objective lens from the fourth embodiment.

DESCRIPTION OF THE PREFERRED EMBODIMENTS

Figure 1:
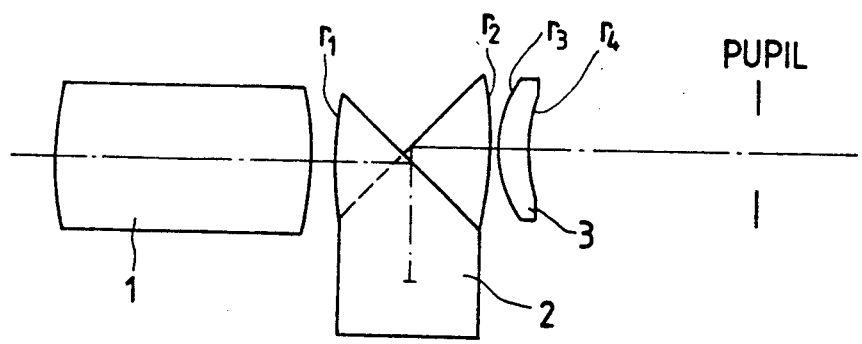
FIG. 1 is a sectional view showing the arrangement of a conventional example.
Figure 2:
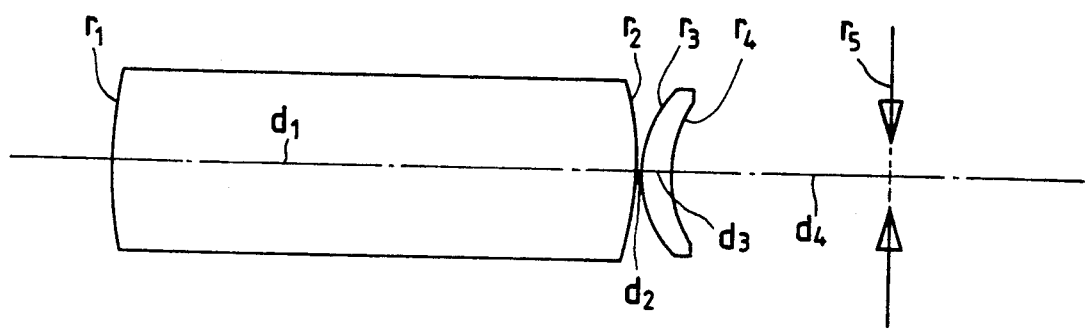
FIGS. 2 and 3 are a developed view and aberration curve diagrams, respectively, of the optical system excluding the objective lens from the conventional example.

Referring now to the embodiment shown in the drawings, in which like reference numerals and symbols are used to designate like members with the conventional example, the present invention will be described in detail below.

FIRST EMBODIMENT

Figure 4:
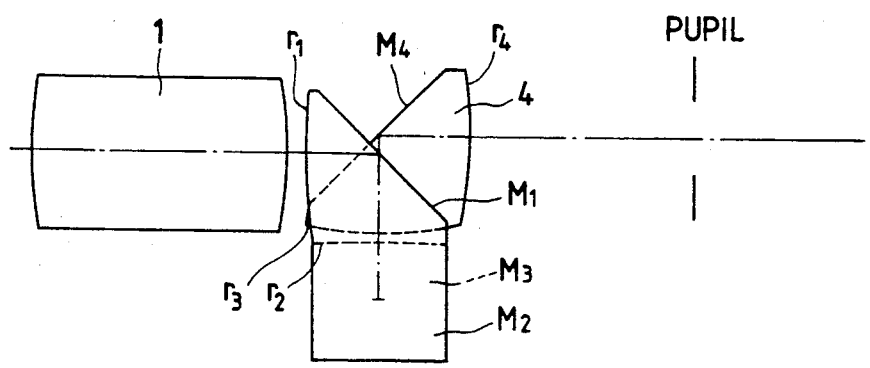
FIG. 4 is a sectional view showing the arrangement of a first embodiment of the real image mode finder optical system according to the present invention.

FIG. 4 is a sectional view showing the arrangement of the first embodiment, which, by combining an image inverting optical member having a first lens surface $r_1$, a first reflecting surface $M_1$, a second reflecting surface $M_2$, a third reflecting surface $M_3$, a second lens surface $r_2$, and a fourth reflecting surface $M_4$, with an eyepiece having a third lens surface $r_3$ and a fourth lens surface $r_4$, comprises the fourth reflecting surface $M_4$ of the image inverting optical member and the third and fourth lens surfaces $r_3$ and $r_4$ which are the front and rear surfaces of the eyepiece integrally constructed as a prism 4. Also, the first lens surface $r_1$ has a proper curvature to serve as a field lens for performing the transmission of the pupil from the objective lens 1.

In this embodiment, as described in the foregoing, the prism 4 including the fourth reflecting surface $M_4$ which is the last reflecting surface of the image inverting optical member is constructed integral with the eyepiece, so that although the angle of field of the first embodiment is identical with that of the above conventional example, the overall length of the optical system is considerably diminished in comparison with the conventional example.

Figure 5:
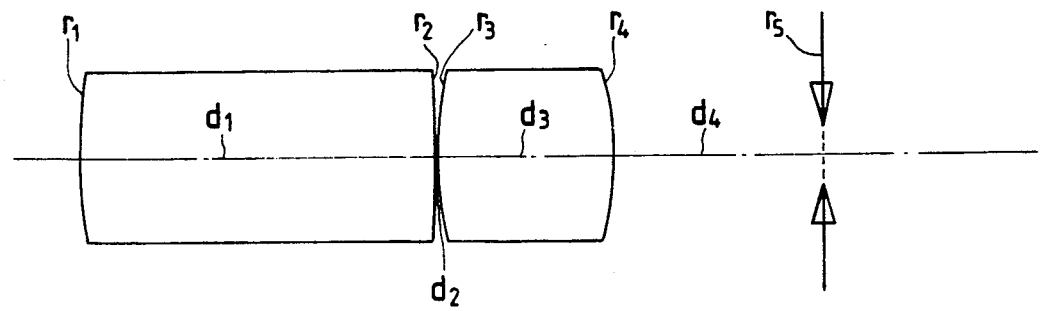
FIGS. 5 and 6 are a developed view and aberration curve diagrams, respectively, of the optical system excluding the objective lens from the first embodiment.
Figure 6:
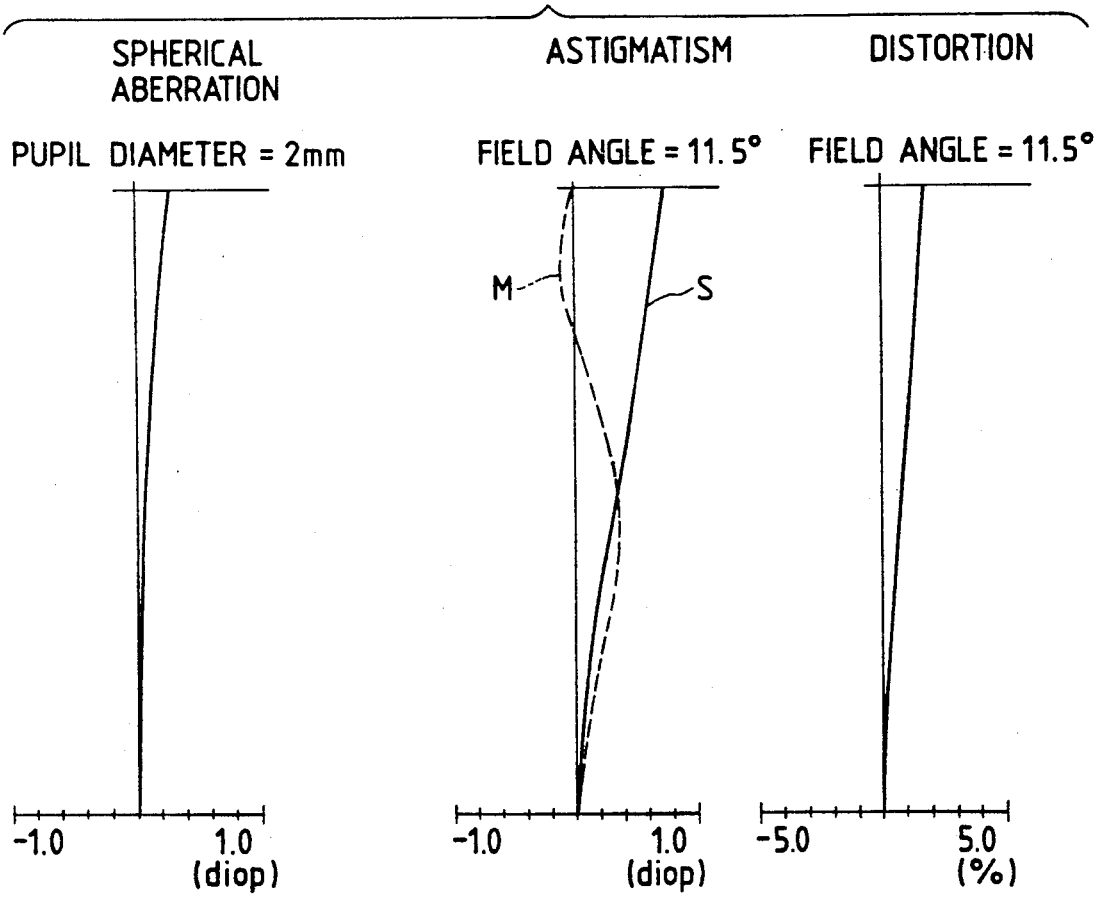

FIGS. 5 and 6 are a developed view and aberration curve diagrams, respectively, of the optical system excluding the objective lens 1 from the first embodiment, and its numerical data are as follows:

| | | | |
|---|---|---|---|
| $r_1 = 32.9330$ | | | |
| | $d_1 = 26.0000$ | $n_1 = 1.49216$ | $\nu_1 = 57.50$ |
| $r_2 = -168.7674$ | | | |
| | $d_2 = 0.2000$ | | |
| $r_3 = 21.6056$ (aspherical surface) | | | |
| | $d_3 = 13.0000$ | $n_2 = 1.49216$ | $\nu_2 = 57.50$ |
| $r_4 = -20.5313$ | | | |
| | $d_4 = 15.0000$ | | |
| $r_5 = $ (pupil) | | | |

Figure 3:
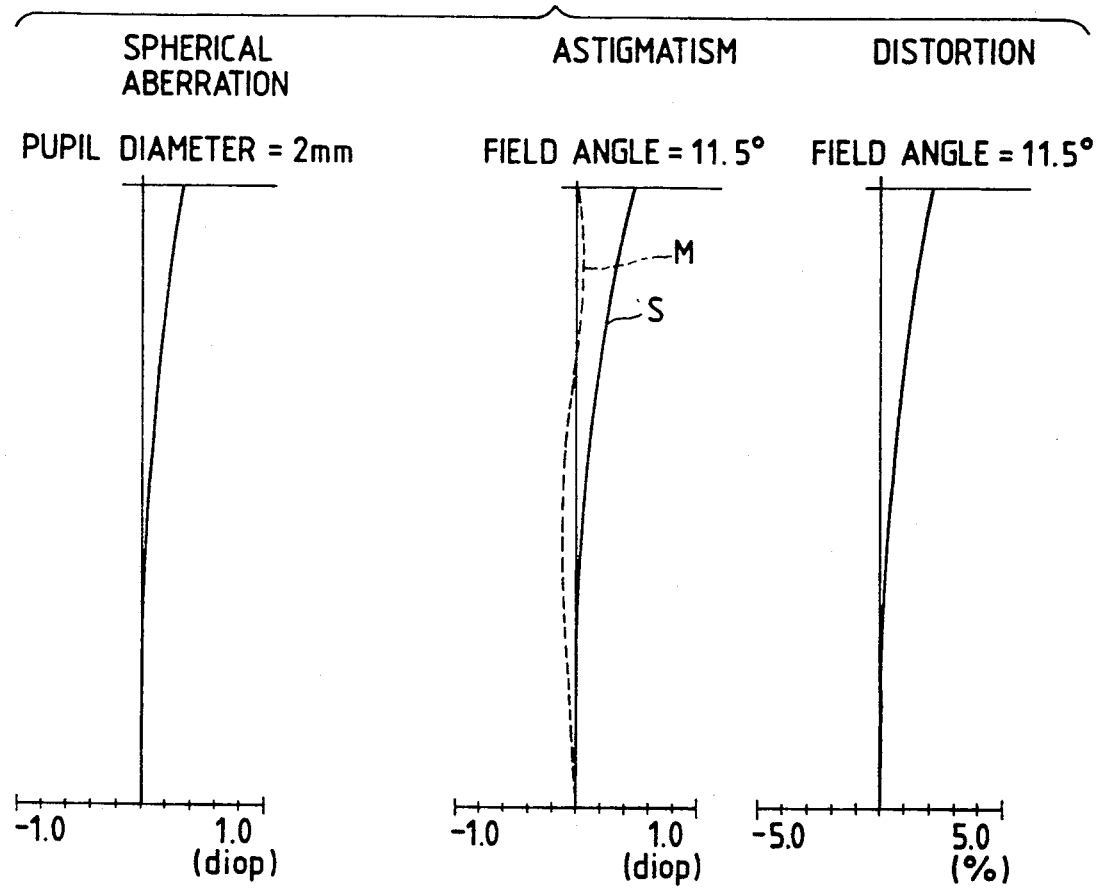

Aspherical coefficients
Third surface
$E = -0.74326 \times 10^{-5}, F = -0.51499 \times 10^{-5}$
$G = -0.16038 \times 10^{-6}, H = -0.18203 \times 10^{-8}$ It is seen that in FIG. 6, as compared with FIG. 3 (the aberration curve diagrams of the conventional example), astigmatism somewhat deteriorates, but the other aberrations remain practically unchanged, so that the optical performance of the system is maintained.

SECOND EMBODIMENT

Figure 7:
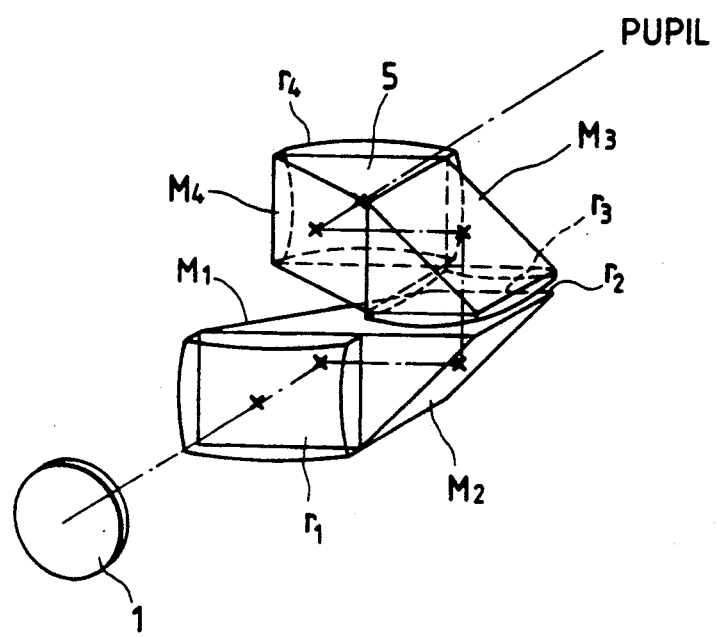
FIG. 7 is a perspective view showing the arrangement of a second embodiment.

FIG. 7 is a perspective view showing the arrangement of the second embodiment, which comprises the third and fourth reflecting surfaces $M_3$ and $M_4$ of the image inverting optical member and the third and fourth lens surfaces $r_3$ and $r_4$ which are the front and rear surfaces of the eyepiece, integrally constructed as a prism 5. The first lens surface $r_1$ of this embodiment, like the first embodiment, also functions as the field lens.

Figure 8:
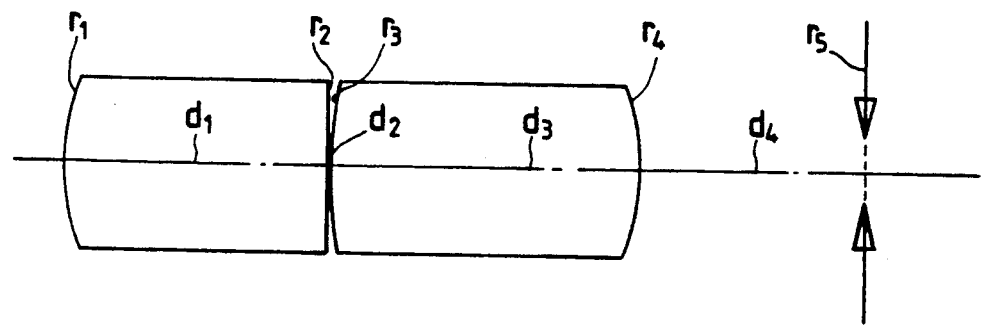
FIGS. 8 and 9 are a developed view and aberration curve diagrams, respectively, of the optical system excluding the objective lens from the second embodiment.
Figure 9:
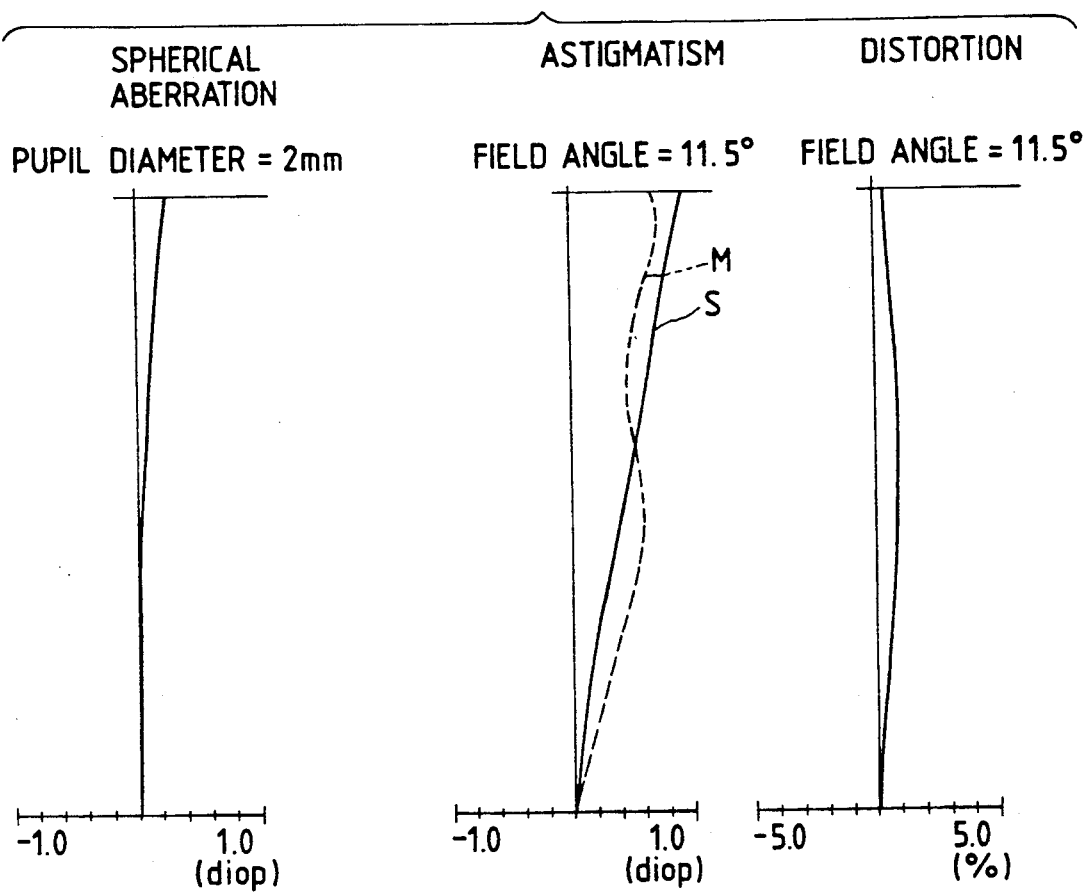

FIGS. 8 and 9 are a developed view and aberration curve diagrams, respectively, of the optical system excluding the objective lens 1 from the second embodiment, and its numerical data are shown below.

| | | | |
|---|---|---|---|
| $r_1 = 484.9295$ | | | |
| | $d_1 = 17.0000$ | $n_1 = 1.49216$ | $\nu_1 = 57.50$ |
| $r_2 = \infty$ | | | |
| | $d_2 = 0.2000$ | | |
| $r_3 = 24.0351$ (aspherical surface) | | | |
| | $d_3 = 21.0000$ | $n_2 = 1.49216$ | $\nu_2 = 57.50$ |
| $r_4 = -14.6237$ | | | |
| | $d_4 = 15.0000$ | | |
| $r_5 = $ (pupil) | | | |

Aspherical coefficients
Third surface
$E = 0.52597 \times 10^{-4}, F = -0.17618 \times 10^{-4}$
$G = 0.67459 \times 10^{-6}, H = -0.1025 \times 10^{-7}$ It is seen that in FIG. 9, as compared with FIG. 3 (the aberration curve diagrams of the conventional example), astigmatism somewhat deteriorates, but contrary, spherical aberration and distortion are improved, so that the optical performance of the system is maintained.

THIRD EMBODIMENT

Figure 10:
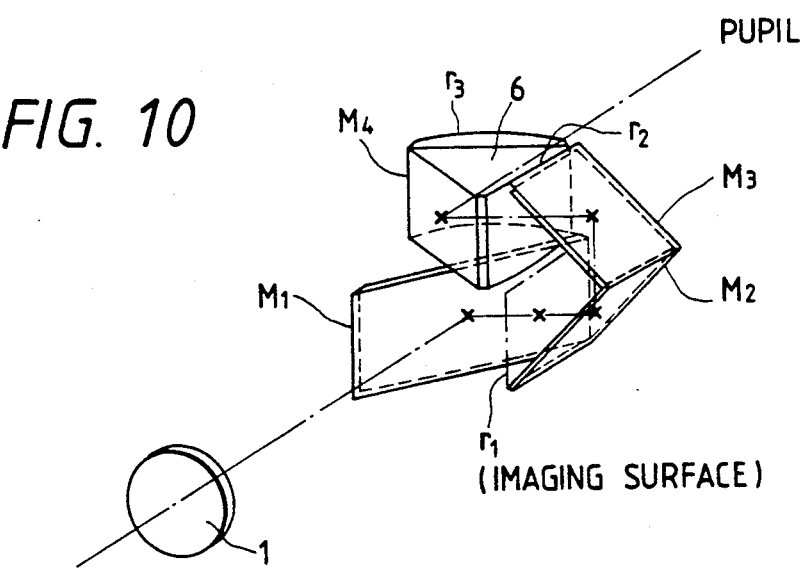
FIG. 10 is a perspective view showing the arrangement of a third embodiment.

FIG. 10 is a perspective view showing the arrangement of the third embodiment, which, by providing an imaging position (the first lens surface $r_1$) midway between the first and second reflecting surfaces $M_1$ and $M_2$ of the image inverting optical member and configuring the second and third reflecting surfaces $M_2$ and $M_3$ as mirror-like totally reflecting surfaces, comprises the fourth reflecting surface $M_4$ of the image inverting optical member and the second and third lens surfaces $r_2$ and $r_3$ which are the front and rear surfaces of the eyepiece, integrally constructed as a prism 6. Also, the first reflecting surface $M_1$ may well be disposed in the objective lens 1. Further, the objective lens 1 may also be constructed, as a prism, integral with the first reflecting surface $M_1$.

Figure 11:
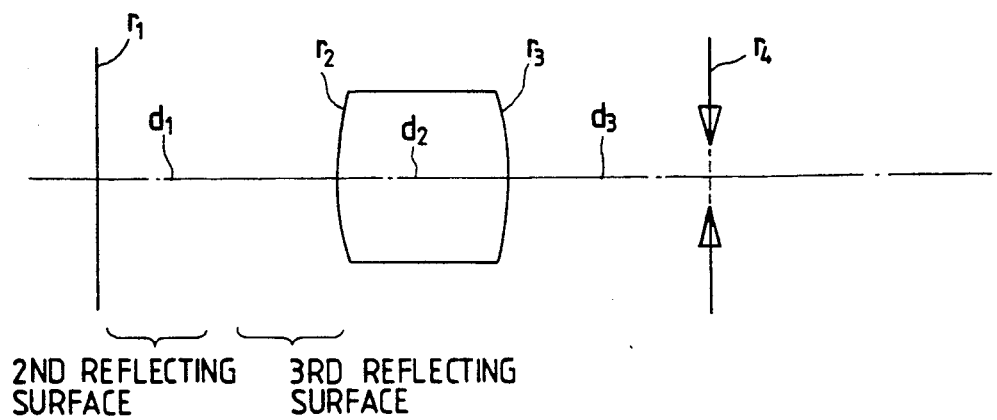
FIGS. 11 and 12 are a developed view and aberration curve diagrams, respectively, of the optical system excluding the objective lens from the third embodiment.
Figure 12:
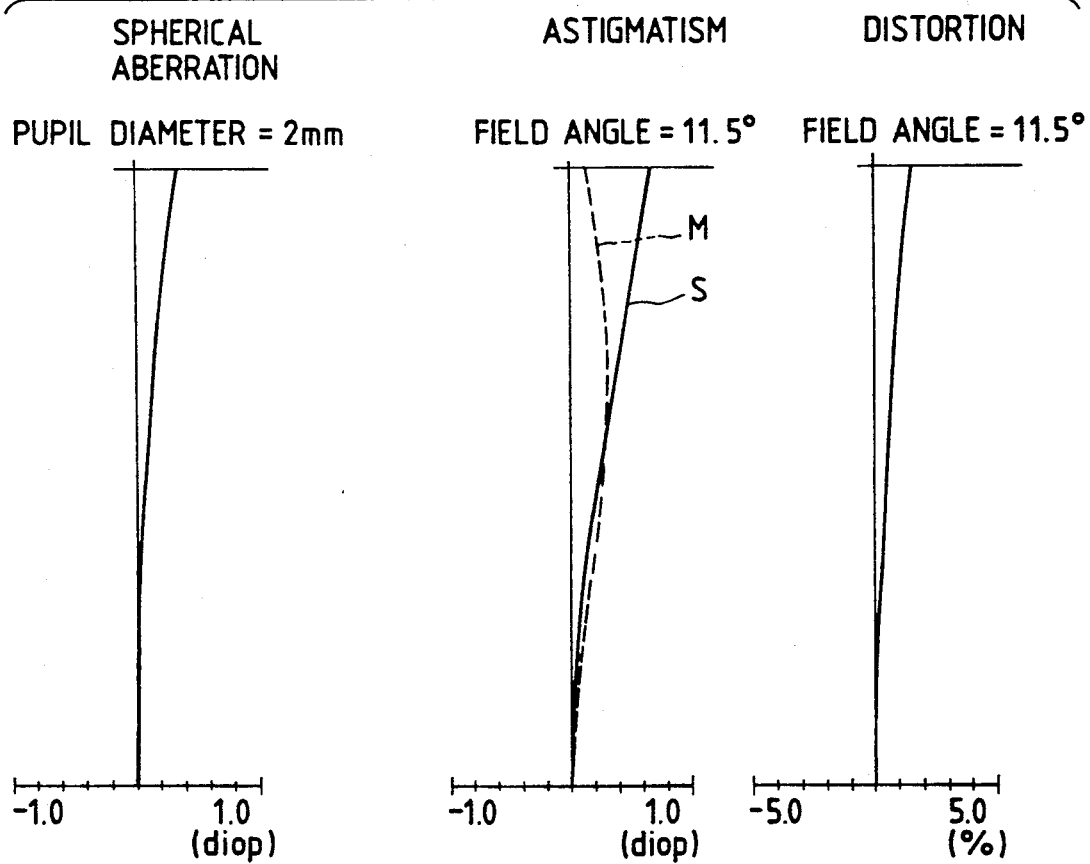

FIGS. 11 and 12 are a developed view and aberration curve diagrams, respectively, of the optical system excluding the objective lens 1 from the third embodiment, and its numerical data are shown below.

$r_1 = \infty$
$\quad d_1 = 17.6000$
$r_2 = 18.8312$ (aspherical surface)
$\quad d_2 = 13.0000 \quad n_1 = 1.49216 \quad \nu_1 = 57.50$
$r_3 = -20.7600$
$\quad d_3 = 15.0000$
$r_4 = $ (pupil)

Aspherical coefficients
Second surface
$E = -0.37710 \times 10^{-4}, F = -0.13662 \times 10^{-5}$
$G = 0.29114 \times 10^{-7}, H = -0.31242 \times 10^{-9}$ It is seen that in FIG. 12, as compared with FIG. 3 (the aberration curve diagrams of the conventional example), respective aberrations are substantially the same as those of FIG. 3 and the optical performance of the system is maintained. Also, if the field lens is disposed at the imaging position, the transmission of the pupil will favorably be performed.

Figure 13:
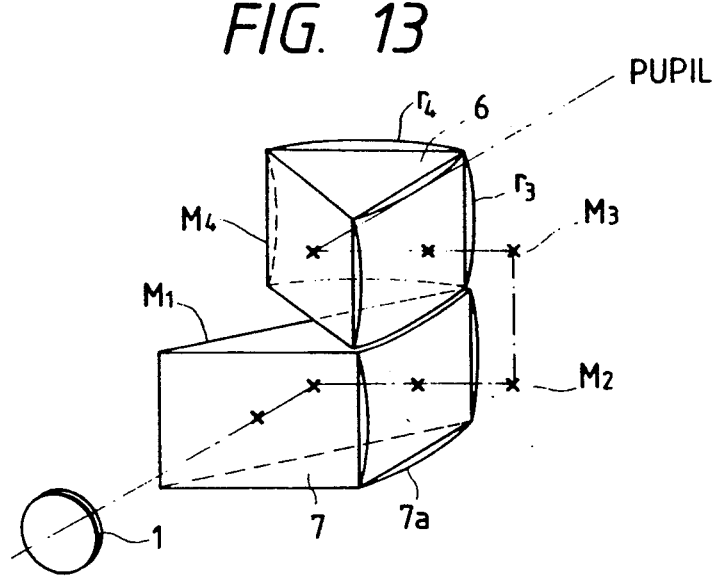
FIG. 13 is a perspective view showing the arrangement of a modification of the third embodiment.

FIG. 13 is a perspective view showing the arrangement of the modification of the third embodiment, which comprises the first reflecting surface $M_1$ of the image inverting optical member in the third embodiment which is configured as a triangular prism 7, constructed or worked integral with the prism 6 including the fourth reflecting surface $M_4$ to enable the number of parts to be reduced. Even in such an instance, the use of an exit surface 7a of the prism 7 provided with the curvature makes it possible to serve as the field lens.

FOURTH EMBODIMENT

Figure 14:
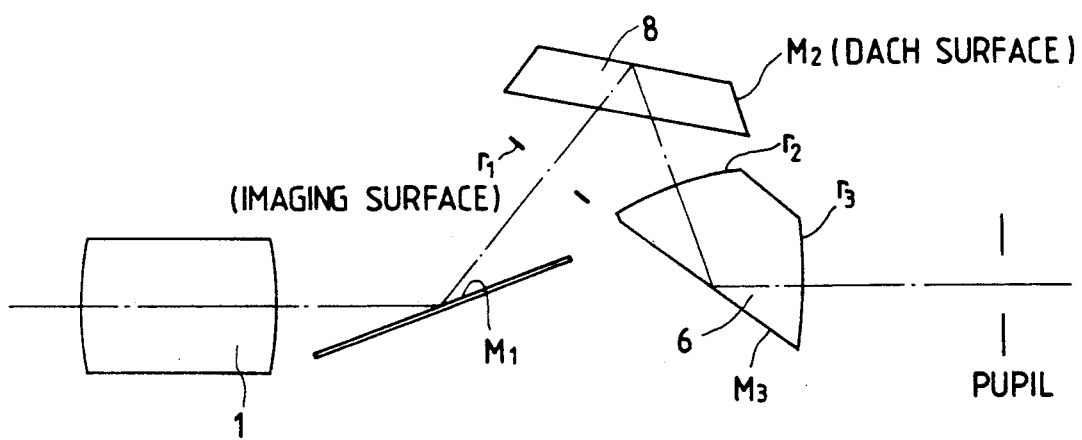
FIG. 14 is a sectional view showing the arrangement of a fourth embodiment.

FIG. 14 is a sectional view showing the arrangement of the fourth embodiment, which, by providing the imaging position (the first lens surface $r_1$) midway between the first reflecting surface $M_1$ of the image inverting optical member and the second reflecting surface $M_2$ which is the roof surface of a Dach prism 8, comprises the third reflecting surface $M_3$ of the image inverting optical member and the second and third lens surfaces $r_2$ and $r_3$ which are the front and rear surfaces of the eyepiece, integrally constructed as the prism 6. Also, the first reflecting surface $M_1$ may well be provided in the objective lens 1. Further, the objective lens 1 may also be constructed, as a prism, integral with the first reflecting surface $M_1$.

Figure 15:
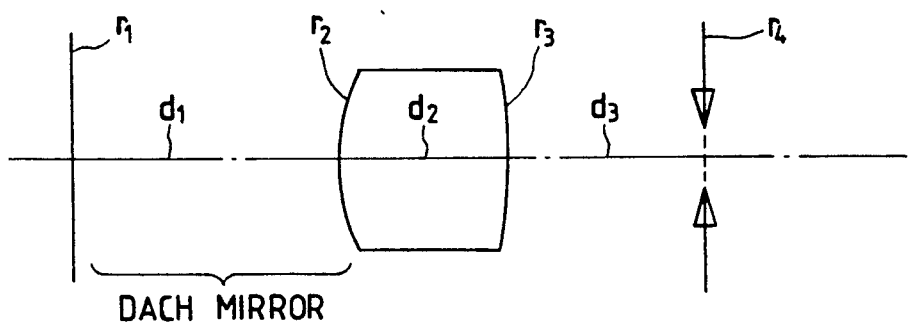

FIGS. 15 and 16 are a developed view and aberration curve diagrams, respectively, of the optical system excluding the objective lens 1 from the fourth embodiment, and its numerical data are as follows:

$r_1 = \infty$
$\quad d_1 = 20.2000$
$r_2 = 13.1575$ (aspherical surface)
$\quad d_2 = 13.0000 \quad n_1 = 1.49216 \quad \nu_1 = 57.50$
$r_3 = -47.1326$
$\quad d_3 = 15.0000$
$r_4 = $ (pupil)

Aspherical coefficients
Second surface
$E = -0.77284 \times 10^{-4}, F = -0.78301 \times 10^{-6}$ -continued $G = -0.35007 \times 10^{-7}, H = -0.30828 \times 10^{-9}$ It is seen that in FIG. 16, as compared with FIG. 3 (the aberration curve diagrams of the conventional example), spherical aberration and astigmatism are nearly equivalent to those of FIG. 3, but contrary, distortion is improved, so that the optical performance of the system is maintained.

In each of the above embodiments, however, the object image formed through the objective lens 1 is assumed to be located adjacent to the first lens surface. Further, each of the above aberration curve diagrams shows, as an object point, the position of the image formed by the objective lens 1. Reference symbols $r_1$, $r_2$, . . . represent radii of curvature of individual lens surfaces, $d_1$, $d_2$, . . . thicknesses of individual lenses and spaces therebetween, $n_1$, $n_2$, . . . refractive indices of individual lenses, $\nu_1$, $\nu_2$, . . . Abbe's numbers of individual lenses, and E, F, G and H aspherical coefficients of fourth, sixth, eighth and tenth orders, respectively. The configuration of the aspherical surface in each embodiment is expressed by the following equation using the aspherical coefficients:

$$X = \frac{CS^2}{1 + \sqrt{1 - PC^2S^2}} = ES^4 + FS^6 + GS^8 + HS^{10}$$

where X is the distance from the vertex of the aspherical surface in a direction parallel to the optical axis, S is the distance from the vertex of the aspherical surface in a direction perpendicular to the optical axis, and C is the curvature ($=1/r$) at the vertex of the aspherical surface.

What is claimed is:

1. A real image mode finder optical system, comprising:
    a finder objective lens independent of a photographic objective lens;
    a first reflecting member having at least one reflecting surface for erecting an image of an object formed by said finder objective lens, disposed behind a surface of said image; and
    a second reflecting member functioning as an eyepiece, including an entrance surface having a curvature opposite to said first reflecting member with an airspace therebetween, at least one reflecting surface, and an exit surface having a curvature.

2. A finder optical system according to claim 1, wherein at least one of said entrance surface and said exit surface of said second reflecting member is aspherical.

3. A real image mode finder optical system, comprising:
    a finder objective lens independent of a photographic objective lens;
    a reflecting member having at least one reflecting surface for erecting an image of an object formed by said finder objective lens, disposed behind a surface of said image; and
    a prism separated from said reflecting member, including an entrance surface having a curvature, at least one reflecting surface, and an exit surface having a curvature, said entrance surface and said exit surface each functioning as an eyepiece.

4. A real image mode finder optical system as claimed in claim 3 wherein at least one of said entrance surface and said exit surface of said prism is aspherical.

* * * * *